United States Patent

[11] 3,618,846

[72] Inventor Patrick J. Poli
39 Pine St., Plainview, N.Y. 11803

[21] Appl. No. 799,766
[22] Filed Feb. 17, 1969
[45] Patented Nov. 9, 1971

[54] MANUALLY OPERATED SUCTION DEVICE
3 Claims, 6 Drawing Figs.

[52] U.S. Cl. .......... 228/52, 128/278, 222/206
[51] Int. Cl. .......... B23k 3/06
[50] Field of Search .......... 228/52; 222/206, 207, 213, 215; 128/233, DIG. 5, 216, 232, 231, 278

[56] References Cited

UNITED STATES PATENTS

| | | | |
|---|---|---|---|
| 29,699 | 8/1860 | Isaacsen | 222/215 |
| 1,908,056 | 5/1933 | Ring | 228/52 |
| 2,674,247 | 4/1954 | Lellan | 128/232 |
| 2,979,056 | 4/1961 | Wiseman | 128/278 |
| 2,717,598 | 9/1955 | Krasno | 128/216 |
| 2,890,699 | 6/1959 | Miller | 128/278 |
| 2,935,067 | 5/1960 | Bouet | 128/216 |
| 2,947,470 | 8/1960 | Ruben | 128/278 |
| 3,154,222 | 10/1964 | Heckman | 222/215 |
| 3,443,734 | 5/1969 | Fortune | 228/52 |

*Primary Examiner*—John F. Campbell
*Assistant Examiner*—Donald P. Rooney
*Attorney*—James A. Connor

ABSTRACT: A cold tip manually operated suction device having a removable trap for the disposing of collected excess solder.

INVENTOR.
PATRICK J. POLI
BY
AGENT

MANUALLY OPERATED SUCTION DEVICE

This invention relates generally to desoldering devices and in particular to a cold or nonheated suction device having means to trap the removed solder.

With the advent of solid state electronics, printed circuit boards became widely utilized in electronic circuitry. The manufacture of circuit boards required accurate placement and quantity of solder on component connections of boards. Often excess solder flowed onto the connection and required removal. Heretofore, heated tip suction devices, with or without hot tip soldering irons were employed to remove the excess solder. These prior devices were not entirely successful in that the removed oxidized solder had a tendency to clog the passageway of the solder removing device.

The present invention overcomes these prior disadvantages and has for one of its principal objects a suction device having a cold tip.

Another object of the invention resides in the provision of a cold tip suction desoldering device having manually operated suction means.

Still another object is to provide means to trap the removed solder to prevent solder from entering the manually operated suction means.

Yet another object is to provide removable trap means that can be readily emptied of trapped solder without undue cleaning or disposal of the trap means.

Other ancillary objects will be, in part, hereinafter pointed out and will be, in part, hereinafter apparent.

Figure 1:
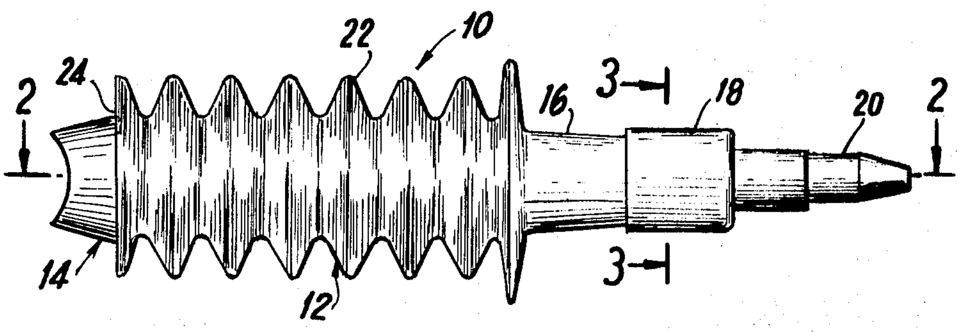
FIG. 1 is a side elevation of the device.
Figure 2:
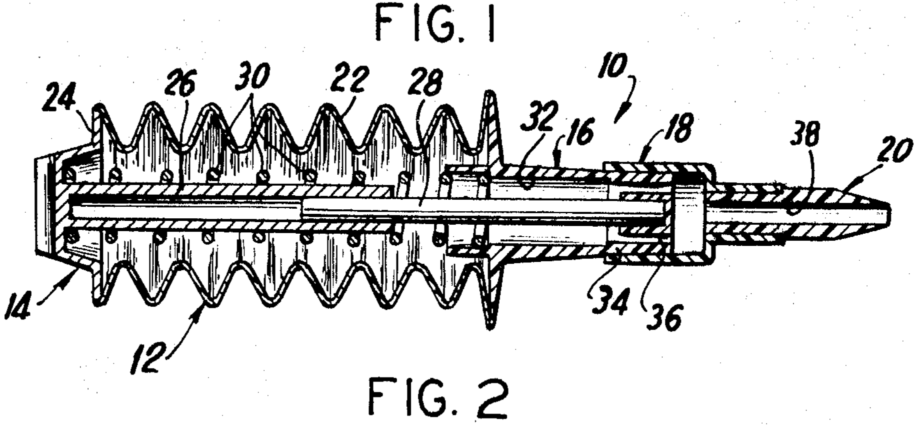
FIG. 2 is a longitudinal cross section taken along line 2—2 of FIG. 1.

Referring to the drawing in detail, 10 generally designates the desoldering device which comprises bellows section 12, plunger 14, body section 16, trap 18 and tip 20.

Bellows section 12 comprises a circular flexible cover 22 sealed at one end to thumb guide 24 of plunger 14 and sealed at the other end to body 16 to provide a hollow collapsible chamber. To facilitate the collapsing of bellows section 12, thumb guide 24 is secured to a hollow tube 26 in which a guide rod 28 partially resides. Guide rod 28 is affixed to body section 16 and guides plunger 14 in a linear path when bellows section 12 is manually collapsed. It will be noted that spring 30, circumjacently disposed around tube 26 abuts at one end against thumb guide 24 and abuts at the other end against body member 16.

Thus, spring 30 is compressed when the bellows section 12 is manually collapsed and when manual pressure is released urges bellows section 12 to its initial fully extended position. During the return of bellows section 12 to its initial position, suction is created at tip 20, as will be hereinafter pointed out.

Figure 3:
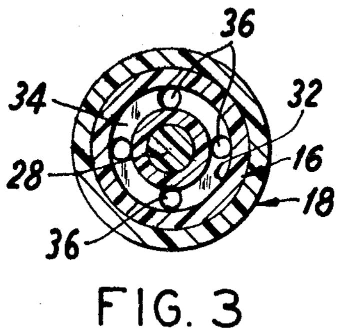
FIG. 3 is a transverse cross section taken along line 3—3 of FIG. 1.

Referring to FIG. 3, it will be noted that body 16 is provided with a through bore 32 that communicates with the sealed hollow chamber in bellows section 13 at one end with trap 18 at the other end. The through bore 32 is restricted in its communication with trap 18 by means of an apertured radial flange 34. Flange 34 is provided with plural apertures 36 to permit the expulsion of air from the chamber in bellows section 12 through bore 32, apertures 36, trap 18 and central bore 38 in tip 20. The total diametrical area of the plural apertures 36 is much less than the diametrical area of bore 32 in body 16 and individually less in diametrical area than the diametrical area of bore 38 in tip 20. Thus, the apertured flange 34 restricts the return of air into the expanding bellows section 12 and creates a relatively longer lasting suction at the orifice entrance to bore 38 in tip 20.

Molten solder, when drawn into bore 38 in tips 20, tends to flow in globular form, the diameter of which is determined by the diameter of bore 38. The globules are drawn into trap 18 and against one or more of the apertures 36 in flange 34. Because of the radial dispersal of apertures 36, the unclogged apertures equalize the suction pressure on both sides of flange 34 and thereby prevent solder in trap 18 from being drawn through the solder clogged aperture 36.

Further, the globular size of the trapped solder, as determined by the bore 38, is relatively larger than the diameter of the clogged apertures 36 and therefore does not flow through said clogged apertures.

The body 16, trap 18 and tip 20 are preferably formed from an inert material, such as "Teflon," to which molten solder will not adhere.

The press fit of body section 16 into trap 18 permits the manual separation of trap 18 from body 16 when the amount of solder in trap 18 reaches a maximum quantity and requires disposal.

Figure 5:
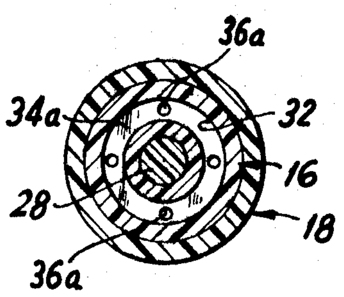
FIG. 5 is a cross section illustrating a removable apertured flange.
Figure 4:
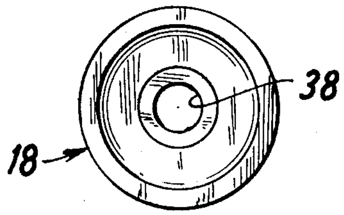
FIG. 4 is a view of the trap after removal of the bellows section for trap cleaning purposes.
Figure 6:
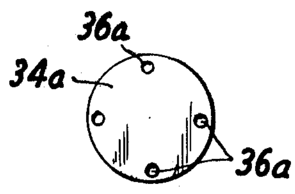
FIG. 6 is a plan elevation of the removable apertured flange.

A second embodiment of the invention incorporates a removable radial flange 34*a*, FIGS. 5 and 6, whereby the suction device may be modified to vary the amount of air passing into the collapsed bellows chamber. Flanges 34*a* have apertures 36*a* that are smaller in diameter than apertures 36 previously described and which therefore restrict the flow of air returning. The substitution of differing sized apertured flanges 34*a* in the trap section permits the suction device to be utilized with various types of molten solder.

Thus there has been shown and described a practical application of the invention. However, while several embodiments have been shown and described, it will be understood that modifications and changes could be made without departing from the scope of the invention as set forth in the following claims.

The invention claimed is:

1. In a device for removing molten solder from a soldered connection, in combination,
   - a. a manually operable suction means including a lineally movable bellows having guide means,
   - b. a body connected to said manually operable suction means having an internal axial fixed shaft adapted to cooperate with said bellows guide means to guide the movement of said bellows in a linear direction,
   - c. a trap member attached to said body,
   - d. a flange disposed between said trap and said suction means having plural oppositely disposed apertures therein, and
   - e. the apertures in said flange having a predetermined diameter.
   - f. a tip having a through bore communicating with said trap,
   - g. and the dimension of said through bore being of a predetermined diameter greater than the diameter of the apertures in said apertured flange to permit air to be drawn through same of said apertures and prevent flow of molten solder through the other apertures in said apertured flange.
2. In a device as set forth in claim 1,
   - a. and said trap being adapted to be removed from said body to dispose of solder collected in said trap.
3. In a device according to claim 1,
   - a. and said body, trap, and tip being formed of a common inert material to prevent the adhering of molten solder thereto.

* * * * *